US008774767B2

(12) United States Patent
Yoo et al.

(10) Patent No.: US 8,774,767 B2
(45) Date of Patent: Jul. 8, 2014

(54) METHOD AND APPARATUS FOR PROVIDING PHONEBOOK USING IMAGE IN A PORTABLE TERMINAL

(75) Inventors: Ji-Yeon Yoo, Yongin-si (KR); Jae-Hwan Kim, Suwon-si (KR); Young-June Woo, Hwaseong-si (KR); Myung-Ji Kang, Seongnam-si (KR); Yong Kwon, Bucheon-si (KR); Jin-Pyo Eun, Seoul (KR); Myung-Kyu Yang, Seoul (KR); Sin-Jae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1188 days.

(21) Appl. No.: 12/176,857

(22) Filed: Jul. 21, 2008

(65) Prior Publication Data

US 2009/0023472 A1 Jan. 22, 2009

(30) Foreign Application Priority Data

Jul. 19, 2007 (KR) .................. 10-2007-0072152
Jun. 10, 2008 (KR) .................. 10-2008-0054021

(51) Int. Cl.
*H04L 12/58* (2006.01)
*H04W 4/00* (2009.01)

(52) U.S. Cl.
USPC ....................................... 455/412.1; 455/466

(58) Field of Classification Search
USPC ............ 455/412, 412.1, 414.2, 466, 418, 415
See application file for complete search history.

(56) References Cited

U.S. PATENT DOCUMENTS

| 2004/0008258 A1* | 1/2004 | Aas et al. ................ 348/207.1 |
| 2004/0207722 A1 | 10/2004 | Koyama et al. |
| 2008/0309617 A1* | 12/2008 | Kong et al. .................... 345/157 |

FOREIGN PATENT DOCUMENTS

| CN | 1834988 A | 9/2006 | |
| CN | 101159805 A | 4/2008 | |
| EP | 0944019 A2 | 9/1999 | |
| EP | 0944019 A3 | 9/2001 | |
| EP | 1 229 496 | * 1/2002 | ............... G06T 7/60 |
| EP | 1 229 496 A2 | 8/2002 | |
| EP | 1 432 226 | * 3/2003 | ............... H04N 1/00 |
| EP | 1 432 226 A1 | 6/2004 | |
| EP | 1 703 442 | * 3/2006 | ............... G06K 9/00 |
| EP | 1 703 442 A1 | 9/2006 | |
| EP | 1 860 853 | * 5/2007 | ............ G06Q 10/00 |
| EP | 1 860 853 A1 | 11/2007 | |
| EP | 1 916 588 A1 | 4/2008 | |
| JP | 2004-62868 A | 2/2004 | |
| JP | 2005-72958 A | 3/2005 | |
| JP | 2006-165821 A | 6/2006 | |
| JP | 2006-165821 A1 | 6/2006 | |
| JP | 2006-259921 A | 9/2006 | |

\* cited by examiner

*Primary Examiner* — Michael Faragalla
(74) *Attorney, Agent, or Firm* — Jefferson IP Law, LLP

(57) ABSTRACT

A method and apparatus for providing a phonebook using an image in a portable terminal are provided. The method includes recording contact information in metadata of an image, and performing a linkage function using the image having the contact information recorded therein.

34 Claims, 18 Drawing Sheets

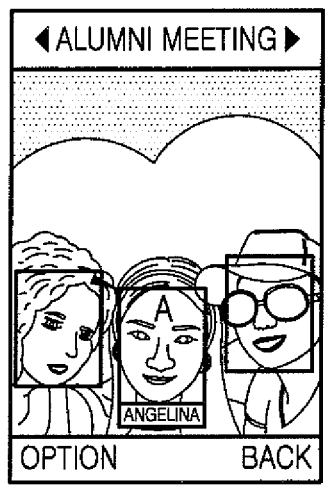
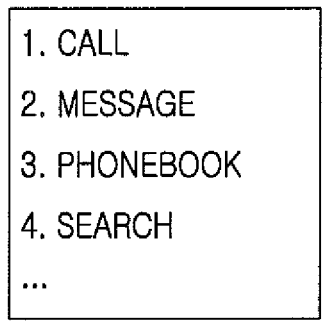
FIG.8

METHOD AND APPARATUS FOR PROVIDING PHONEBOOK USING IMAGE IN A PORTABLE TERMINAL

PRIORITY

This application claims the benefit under 35 U.S.C. §119 (a) of a Korean patent application filed in the Korean Intellectual Property Office on Jul. 19, 2007 and assigned Serial No. 2007-72152 and a Korean patent application filed in the Korean Intellectual Property Office on Jun. 10, 2008 and assigned Serial No. 2008-54021, the entire disclosures of both of which are hereby incorporated by reference.

BACKGROUND OF THE INVENTION

1. Field of the Invention

The present invention relates to a method and apparatus for providing a phonebook using an image in a portable terminal. More particularly, the present invention relates to a method and apparatus for recording and storing contact information in metadata of an image and providing a linkage function such as a phonebook using the image having the contact information recorded therein.

2. Description of the Related Art

Conventional portable terminals provide phonebooks configured to store phone numbers and phone number related information (e.g., names, snapshots, electronic mail (e-mail) address, other phone numbers, addresses, anniversaries, groups, etc.) and implement linkage functions by the phone numbers through a search. The phonebooks are provided based on text, allow a user to manage a list of callers' phone numbers (or contacts) by group, and provide linkage functions such as a call, a Short Message Service (SMS), a Multimedia Message Service (MMS), a facsimile, and e-mail.

In the conventional art, phonebooks can store and manage a phone number and a variety of phone number related information, for example, information such as a name, a snapshot, an e-mail address, other phone numbers, an address, an anniversary, and a group as illustrated in FIG. 1. Also, the phonebook can store and manage a minimal amount of information such as the phone number and the name inputted by a user. That is, there may be several and up to a dozen information fields in a phonebook, but the phonebook has a drawback in that memory is easily wasted due to information fields that are included but not frequently used as a result of the information being selectively inputted and stored by the user.

Also, the phonebook has an inconvenience in that a user has to manually indicate and separate a group of callers each corresponding to phone numbers one by one in order to manage a list of phone numbers on a per-group basis. Further, the phonebook has a disadvantage in that, when a user attempts an action for a group, it is difficult to intuitively identify who is a member of the group because the phonebook is provided based on text.

SUMMARY OF THE INVENTION

An aspect of the present invention is to address at least the above-mentioned problems and/or disadvantages and to provide at least the advantages below. Accordingly, one aspect of the present invention is to provide a method and apparatus for providing a phonebook using an image in a portable terminal.

Another aspect of the present invention is to provide a method and apparatus for providing a phonebook function by recording contact information in metadata of an image in a portable terminal.

A further aspect of the present invention is to provide a method and apparatus for recording contact information in an image, using face recognition and an existing phonebook database in a portable terminal.

Still another aspect of the present invention is to provide a method and apparatus for efficiently managing contacts on a per-group basis by recording contact information in an image in a portable terminal.

Yet another aspect of the present invention is to provide a method and apparatus for increasing security using video information that is acquired through face recognition in a portable terminal.

The above aspects are addressed by providing a method and apparatus for providing a phonebook using an image in a portable terminal.

According to one aspect of the present invention, a method for providing a phonebook using an image in a portable terminal is provided. The method includes recording contact information in metadata of an image, and performing a linkage function using the image having the contact information recorded therein.

According to another aspect of the present invention, an apparatus for providing a phonebook using an image in a portable terminal is provided. The apparatus includes a contact image manager for recording contact information in metadata of an image, and a controller for controlling a performance of a linkage function using the image having the contact information recorded therein.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which:

FIG. 8 is a diagram illustrating a screen configuration for performing a linkage function using an image having contact information recorded therein in a portable terminal according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The following description includes exemplary embodiments of the present invention for recording and storing contact information in metadata of an image and for providing a linkage function such as a phonebook using the image having the contact information recorded therein. The linkage function represents a function such as a voice communication, a video communication, a Short Message Service (SMS), a Multimedia Message Service (MMS), an instant message, a facsimile, electronic mail (e-mail) and the like. In the following description, video information represents information including features that are extracted from a face region of an image recognized through a face recognition algorithm.

Figure 1:
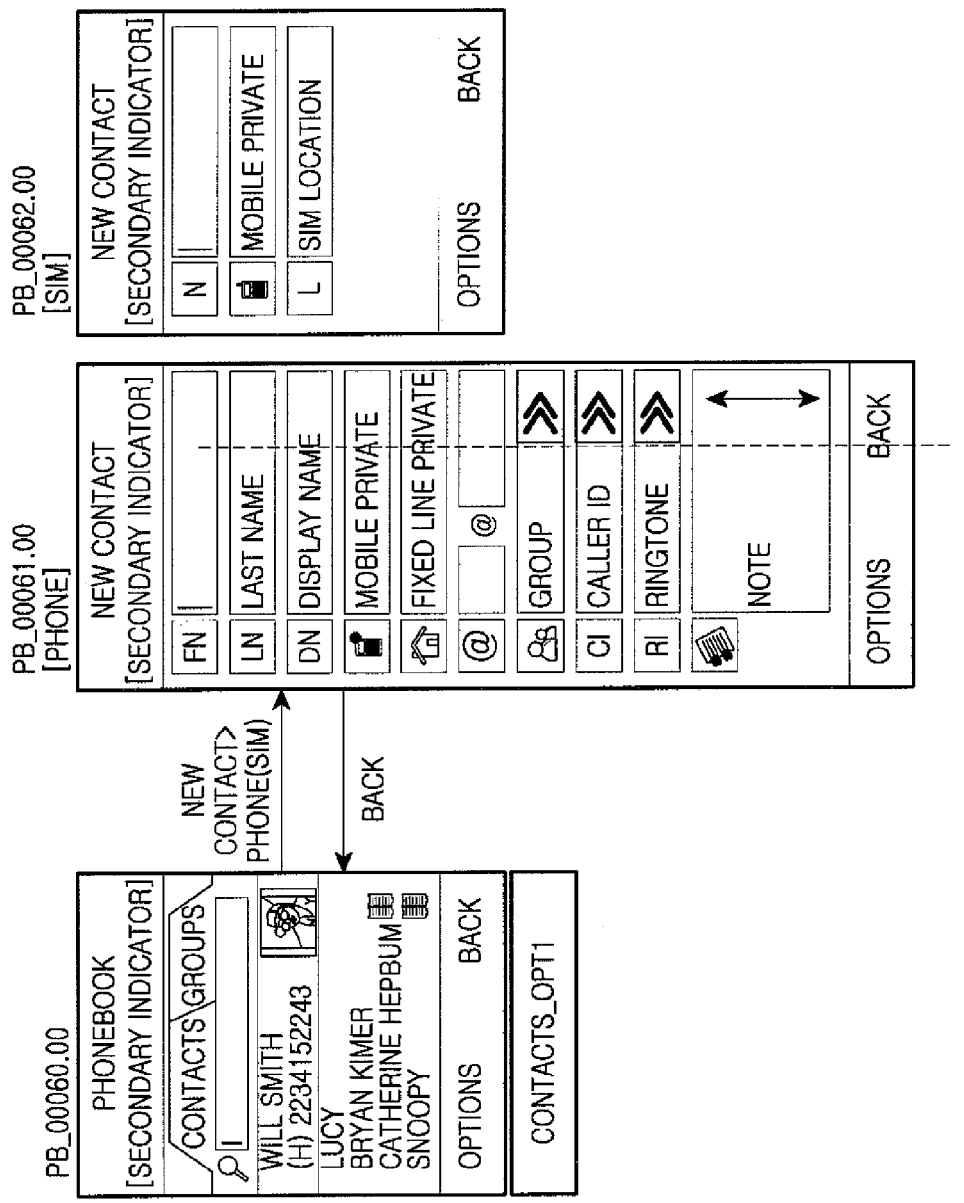
FIG. 1 is a diagram illustrating a screen configuration for inputting contact information into a phonebook in a portable terminal according to the conventional art.
Figure 2:
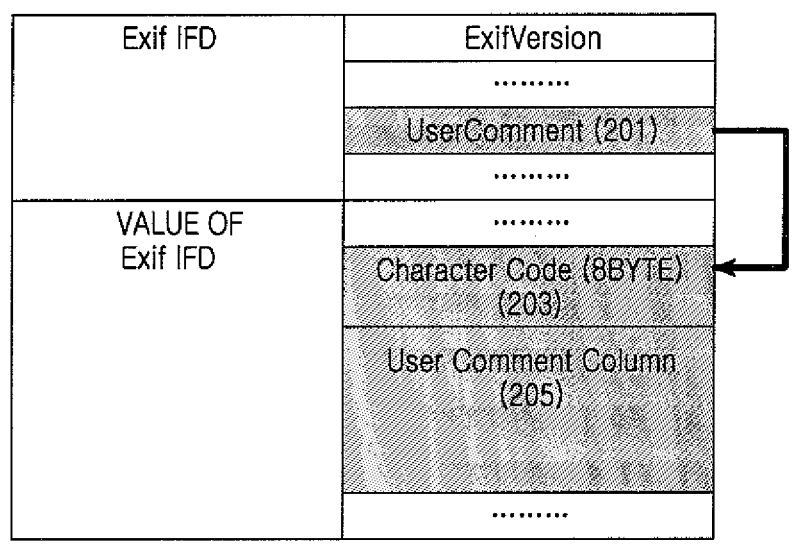
FIG. 2 is a diagram illustrating a structure of an Exchangeable image file (Exif) tag in a general Joint Photographic coding Experts Group (JPEG) image.

An image compressed using Joint Photographic coding Experts Group (JPEG) has metadata. Metadata is additional image-related information associated with image information in compliance with the Exchangeable image file (Exif) policy. That is, the JPEG image may include an Exif tag illustrated in FIG. 2 in order to store metadata. In an Exif Image File Directory (IFD) tag for attribute information, a UserComment 201 field, a field in which a user may directly record a keyword or a comment, may include a feature of having an unlimited number of character codes or numbers. That is, the UserComment 201 field may represent start addresses of a Character Code 203 field and a User Comment Column 205 field for recording data, so a user may input an unlimited amount of data.

Thus, contact information may be recorded in metadata of an image using the UserComment 201 field in an exemplary embodiment of the present invention. More particularly, the contact information may be recorded in the User Comment Column 205 field. A start address of a Character Code 203 that describes data of a User Comment Column 205 having the contact information recorded therein may be recorded in the UserComment 201 field.

Figure 3:
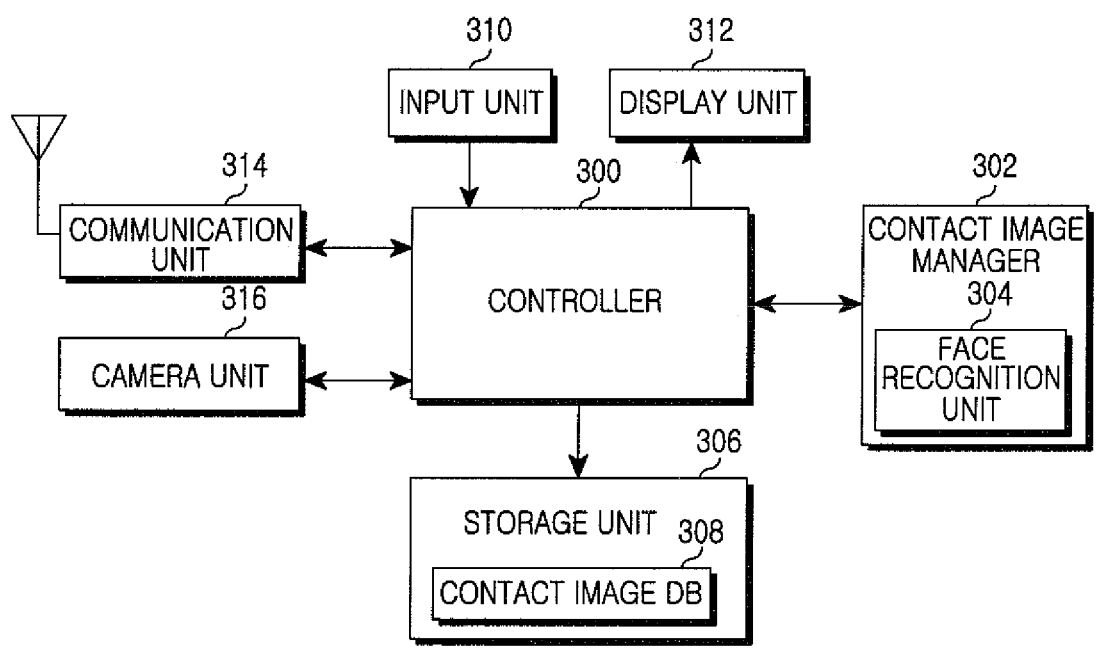
FIG. 3 is a block diagram illustrating a construction of a portable terminal according to an exemplary embodiment of the present invention.

FIG. 3 is a block diagram illustrating a construction of a portable terminal according to an exemplary embodiment of the present invention.

Referring to FIG. 3, the portable terminal may include a controller 300, a contact image manager 302, a face recognition unit 304, a storage unit 306, a contact image DataBase (DB) 308, an input unit 310, a display unit 312, a communication unit 314, a camera unit 316 or the like.

The controller 300 may control and process the general operations of the portable terminal and according to an exemplary embodiment of the present invention, may record contact information in an image and may control and process the performance of a linkage function such as a call, message transmission, and contact transmission using the image having the contact information recorded therein. That is, when an event for recording contact information occurs by selecting a specific image from images stored in the storage unit 306 through the input unit 310, the controller 300 may provide the selected image to the contact image manager 302. Also, the controller 300 may provide the contact information, which is manually inputted through the input unit 310, to the contact image manager 302.

The controller 300 may control and process the performance of a security function using video information acquired from an image through a face recognition function. The security function may be used for limiting the On/Off state of the terminal, privacy protection, use limitation of a specific function, etc. For example, when a pay channel limitation function is set in a Digital Multimedia Broadcasting (DMB) function, if a pay channel is selected by a user, the controller 300 may control the camera unit 316 to perform a face recognition function, analyze a recognized face region, extract video information, compare the extracted video information with video information stored in the storage unit 306, and upon matching the extracted video information with video information stored in the storage unit 306, controlling the communication module 314 to display broadcasting data received from the pay channel on the display unit 312.

Figure 15A:
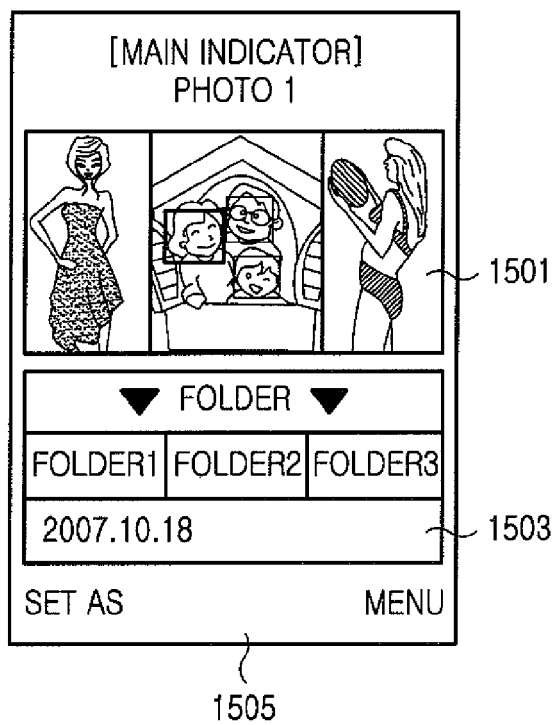
FIGS. 15A and 15B are diagrams illustrating screens for managing an image folder in a portable terminal according to an exemplary embodiment of the present invention.
Figure 15B:
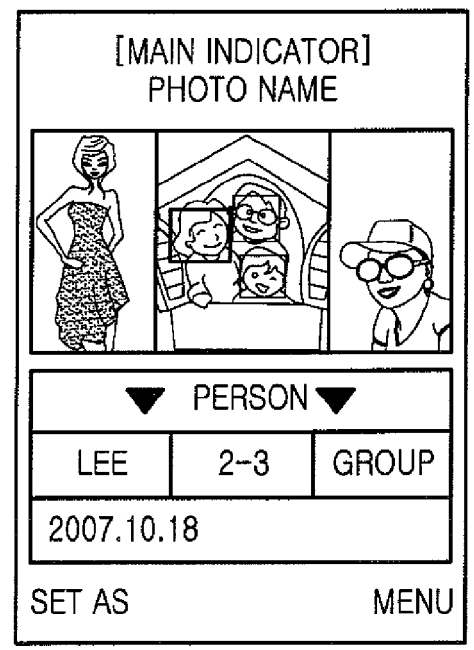

The controller 300 may control and process a function of managing images stored in the storage unit 306 by a user, a group, or a folder using the video information. In other words, the controller 300 may recognize a face region included in an image, classify the image by a user, a group, or a folder including contact information corresponding to the recognized face region, and display the image on the display unit 312. For example, when an image includes three faces, the controller 300 may identify a group including contact information corresponding to each face region of the image and classify the image by group. If there is no contact information corresponding to the face region, the controller 300 may classify the contact information as "unknown." The controller 300 may control the display unit 312 to distinguish and display an image display region 1501, a filtering region 1503 for classifying an image by a user, a group, or a folder, and a menu selection region 1505 as shown in FIG. 15A. Upon execution of a face recognition function during the display of the image, the controller 300 may recognize a face region included in the image and display the face region as shown in FIG. 15B.

Figure 16:
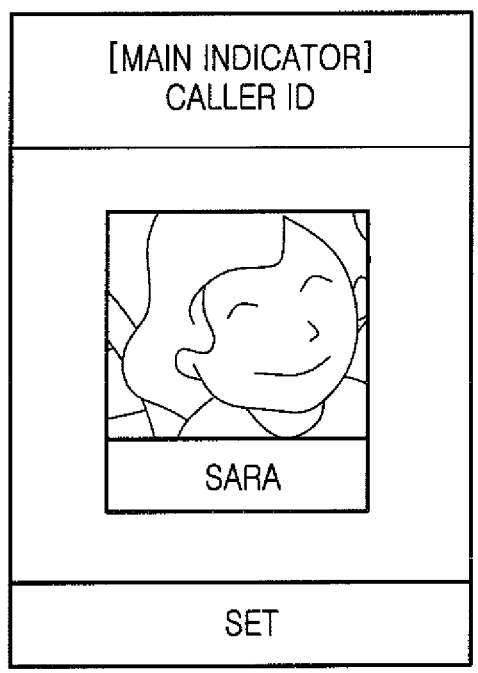
FIG. 16 is a diagram illustrating a screen for setting a caller IDentification (ID) in a portable terminal according to an exemplary embodiment of the present invention.

The controller 300 may control and process a function of setting a recognized face region as a caller IDentification (ID) and storing the recognized face region in the storage unit 306. The caller ID represents a screen for dialing a phone number, etc. for the terminal to implement a communication with a caller's terminal or a screen displayed upon receiving a request (e.g., a call) for executing a communication from a caller's terminal. That is, if an event for setting a caller ID occurs, the controller 300 may identify a face region to be set as a caller ID and contact information, crop only a face region selected from a corresponding image, record contact information in the cropped image through the contact image manager 302, and store the cropped image in the storage unit 306. The controller 300 may store information on a position and size of a cropped face region and a ratio of the cropped face region to the whole picture size in the storage unit 306 and, when the cropped image is displayed on the display unit 312, control and display the cropped image according to the stored position, size, and ratio information as shown in FIG. 16.

Upon receiving a specific image from the controller 300, the contact image manager 302 may record contact information using a UserComment field among metadata record fields of the image. Also, the contact image manager 302 including the face recognition unit 304 may recognize a face existing in the specific image through a face recognition algorithm, may mark a region of the recognized face, and may determine whether there is caller contact information corresponding to the recognized face in an existing phonebook database. The face recognition unit 304 may analyze a face region recognized in an image, extract video information, determine if there is the extracted video information in the storage unit 306, and determine if there is caller contact information corresponding to the recognized face. The face recognition algorithm may be implemented using any of a variety of methods, for example, a Principal Component Analysis (PCA) method, a Fisher Discriminant Analysis (FDA) method, an Independent Component Analysis (ICA) method, and the like. The PCA method extracts a region corresponding to the entirety of a face called "Eigen Face" from the entire image. The FDA method extracts a local face feature through a comparison between a recognized face region and a stored face region. The ICA method classifies a face feature from a recognized entire face region and compares the classified face feature with a feature of a stored face region.

If there is caller contact information, the contact image manager 302 may automatically record the caller contact information and face region information corresponding to the caller contact information in a User Comment Column field. If there is no caller contact information, the contact image manager 302 may receive the caller contact information directly from a user and may record the received contact information and the face region information corresponding to the caller contact information in the User Comment Column field. The contact information may include a name, a phone number, an e-mail address, an address, a group, etc. Among the above-identified contact information, the name and the phone number may be set as required record items. In the above description, the contact image manager 302 may distinguish face regions through the face recognition algorithm, may recognize a face, and may automatically record contact information. Alternatively, the contact image manager 302 may receive a face region and contact information on the face region from a user through the input unit 310 and may record the received face region and contact information. Alternatively, the contact image manager 302 may map the image and the contact information and store the mapping result in the storage unit 306 without recording the contact information in metadata of the image.

The storage unit 306 may store a program and a diversity of types of information necessary for a general operation of the portable terminal and may store an image file and contact information that is stored in an existing phonebook database. Specifically, the storage unit 306 may include the contact image DB 308 according to an exemplary embodiment of the present invention, thus storing images having contact information recorded therein. The storage unit 306 may store contact information and face recognition information corresponding to the contact information under the control of the controller 300. The face recognition information may include video information on a face region corresponding to contact information and in addition, may include information on a position and size of a face region recognized in the entire image and a ratio of the recognized face region by screen size, etc. Also, the face recognition information may include link information on the contact information corresponding to the face region recognized in the image, that is, a position for storing the contact information corresponding to the video information on the face region.

When a file name is set for an image, the storage unit 306 may include the file name in image tag information and store the file name.

The input unit 310 may include a plurality of function keys and may provide data corresponding to a key pressed by a user to the controller 300. More particularly, the input unit 310 inputs contact information to be added to an image file and provides the contact information to the controller 300 according to an exemplary embodiment of the present invention.

The display unit 312 may display state information, numerals, characters and the like generated during the operation of the portable terminal. More particularly, the display unit 312 may display an image in which a face region is marked, may display a window for inputting contact information, and may display contact information mapped to each region on the image under the control of the controller 300 according to an exemplary embodiment of the present invention. The display unit 312 may mark a recognized face region with a frame, a figure, etc.

The communication module 314 may process a signal transmitted/received through an antenna. The communication module 314 may perform a voice communication, a video communication, message sending, contact transmission and the like using contact information recorded in an image under the control of the controller 300. Although not illustrated, the communication module 314 may include a digital broadcasting receiver, thereby receiving digital broadcasting data.

The camera unit 316 may take an image under the control of the controller 300. The camera unit 316 may include a camera sensor for converting a light signal into an analog image signal and a signal processor for converting the analog image signal converted in the camera sensor into digital data. The camera sensor may be a Charge Coupled Device (CCD) sensor and the signal processor may be a Digital Signal Processor (DSP). The camera sensor and the signal processor may be realized integrally or separately.

Figure 4:
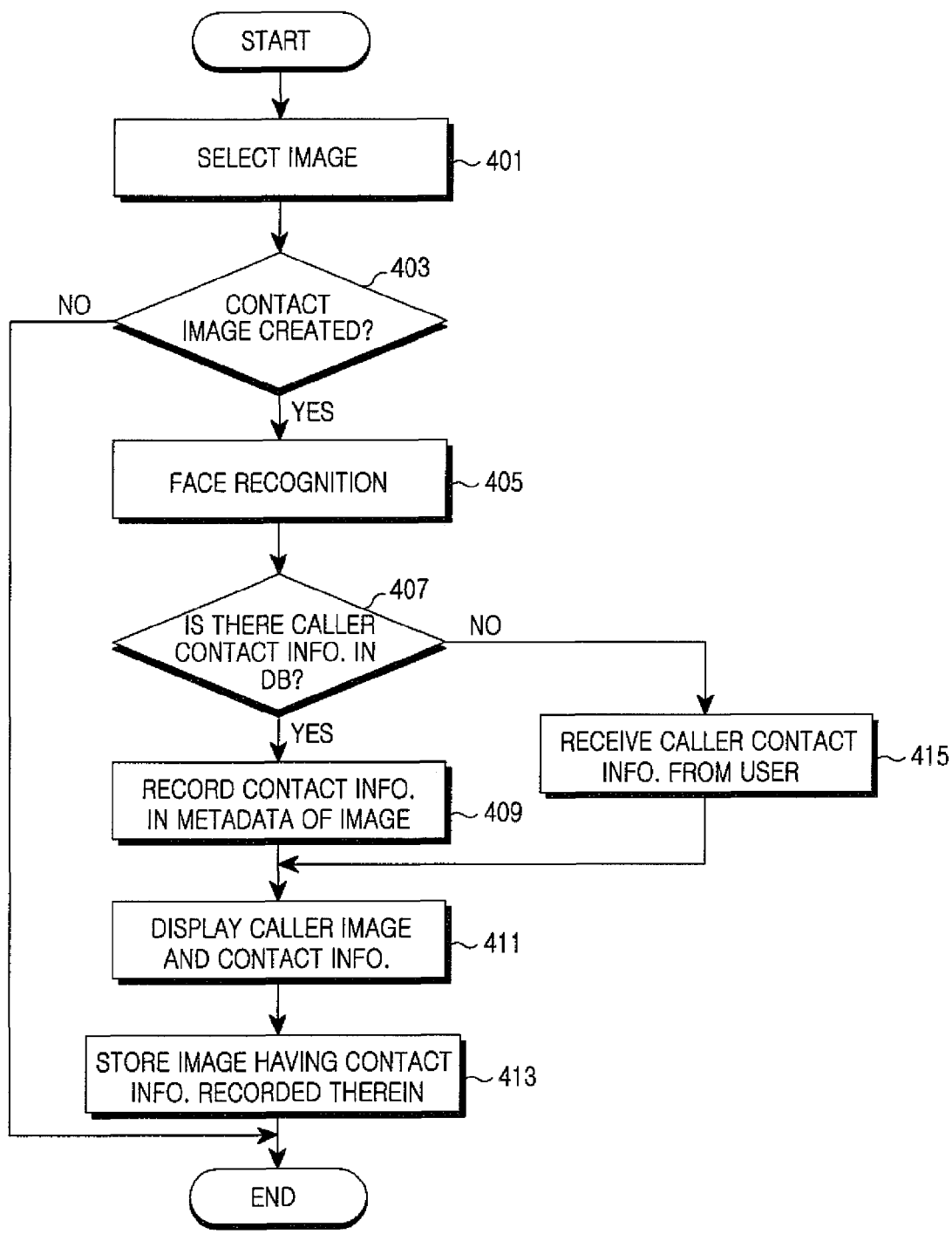
FIG. 4 is a flow diagram illustrating a process of recording contact information using metadata of an image in a portable terminal according to an exemplary embodiment of the present invention.

FIG. 4 is a flow diagram illustrating a process of recording contact information using metadata of an image in a portable terminal according to an exemplary embodiment of the present invention.

Referring to FIG. 4, the terminal may identify a specific image selected by a user in step 401. The image may be an image previously stored in the terminal, an image captured by a camera, or an image transferred to the terminal. The previously stored image may be transferred from an external terminal or may be downloaded through the Internet.

Figure 5:
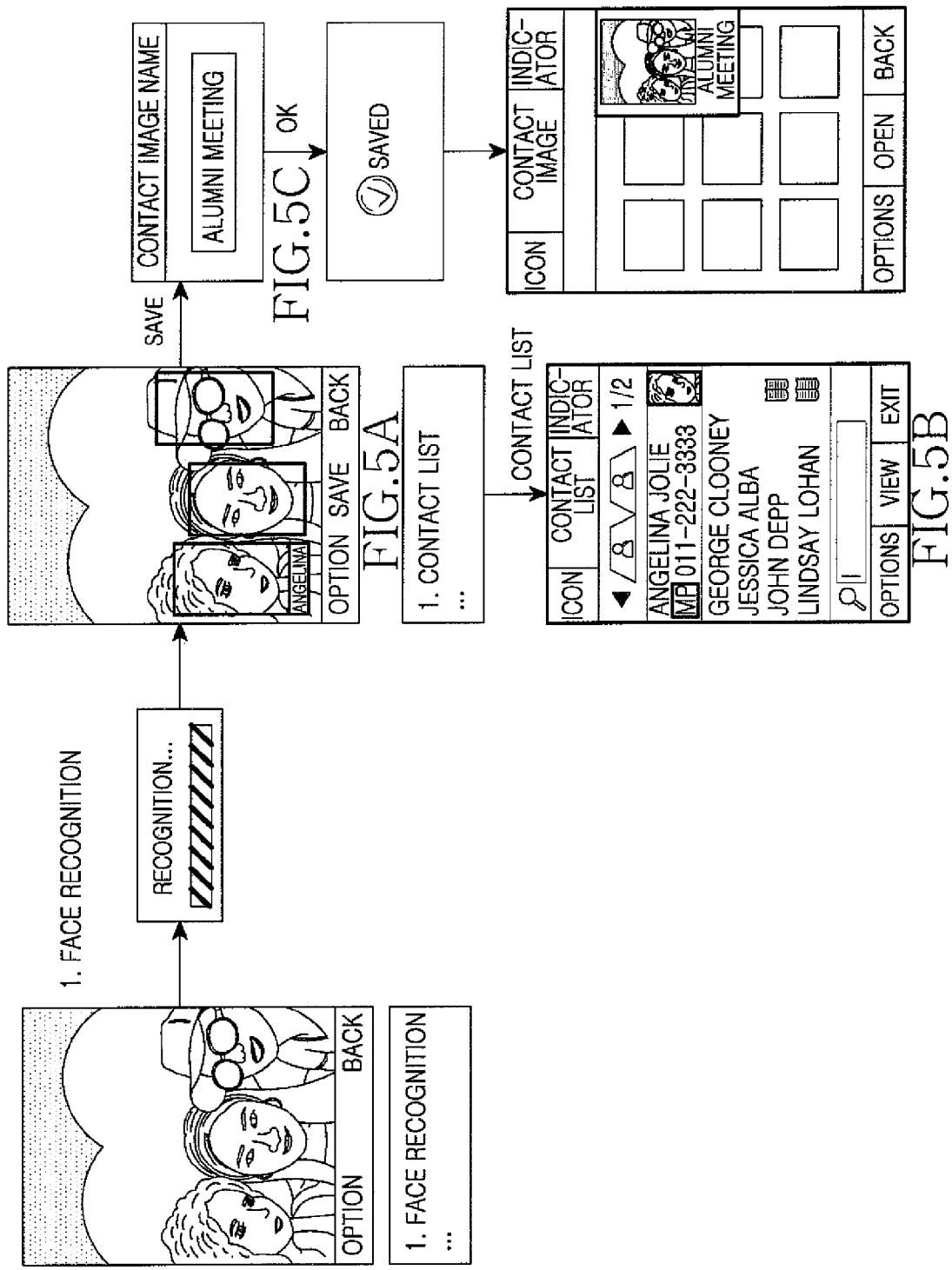
FIGS. 5A to 5C are diagrams illustrating a screen configuration for recording contact information in an image in a portable terminal according to an exemplary embodiment of the present invention.

Then, the terminal may determine whether an event for creating a contact image occurs in step 403. The contact image may represent an image having contact information recorded therein. If the event for creating the contact image does not occur, the terminal may terminate the process. If the event occurs, the terminal may recognize a number of faces existing in the selected image, regions of the faces, persons corresponding to the faces, etc. through a face recognition algorithm in step 405. Here, the terminal may mark and display each region of the face recognized in the image as illustrated in FIG. 5A.

Then, the terminal may determine whether there is contact information of a person (that is, a caller) that is recognized through the face recognition algorithm in an existing phonebook database in step 407. Alternatively, the terminal may determine whether there is video information corresponding to the recognized face region in the existing phonebook database, thereby determining whether there is the caller contact information.

Figure 6:
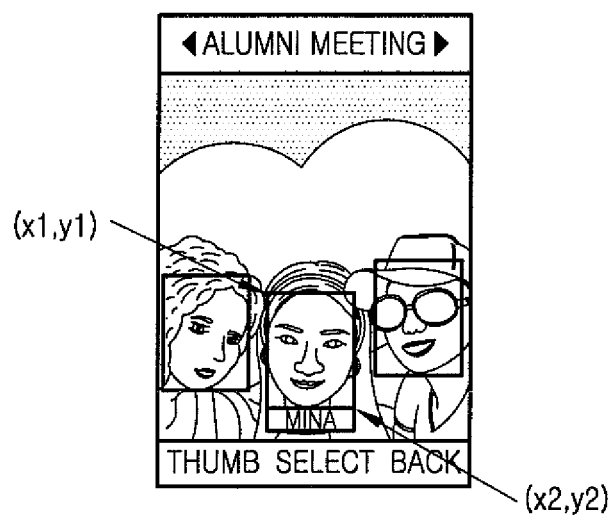
FIG. 6 is a diagram illustrating an image region set for registering contact information in a portable terminal according to an exemplary embodiment of the present invention.

If there is the caller contact information in the existing phonebook database, in step 409, the terminal may record the caller contact information existing in the existing phonebook database and a caller face region recognized in the selected image, in a User Comment Column field among metadata record fields of the image. For example, the terminal records an image region, a name, and a phone number in the User Comment Column field of the image. In cases where the image region is rectangularly marked with two coordinates (x1, y1) and (x2, y2) as illustrated in FIG. 6, the image region may be recorded with "x1, y1, x2, y2."

In cases where there are a plurality of callers in the image, the terminal may record each caller face region together with caller contact information. In cases where there is only one caller in the image, the terminal may record only caller contact information and not a caller face region.

For example, in cases where there are two callers in the image, the terminal may record <image region="x1, y1, x2, y2" name="Angelina" phone number="010-000-0000," image region="x3, y3, x4, y4" name="George" phone number="010-000-1234">. In cases where there is one caller in the image, the terminal may record <name="Angelina" phone number="010-000-0000">.

If there is no caller contact information in the existing phonebook database, in step 415, the terminal may receive caller contact information corresponding to each face region directly from the user and may record the caller contact information and each corresponding face region on an image in the User Comment Column field of the image. Alternatively, the terminal may receive the caller contact information through a search by a user. This is described below in detail with reference to FIGS. 14A and 14B.

Then, in step 411, the terminal may display the recognized caller face region, that is, a caller image and contact information corresponding to the caller image as illustrated in FIG. 5B.

Then, the terminal may store the image having the contact information recorded therein in the contact image DB 308 in step 413. Here, by classifying callers included in the image as one group, the user may be intuitively aware of who is a member belonging to the group by using only the image when the user attempts an operation involving the group. For example, the user may easily identify who is a member belonging to a "Alumni meeting" group by setting and storing an image in the name of the "Alumni meeting" group as illustrated in FIG. 5C.

Then, the terminal may terminate the process.

Figure 17A:
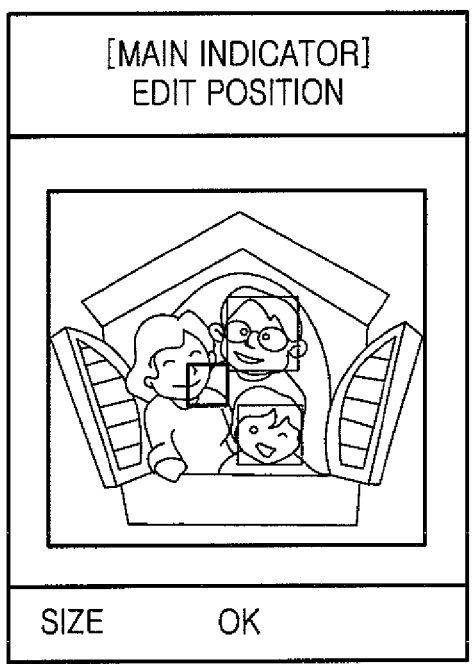
FIGS. 17A and 17B are diagrams illustrating screens for editing a face region recognized in a portable terminal according to an exemplary embodiment of the present invention.
Figure 17B:
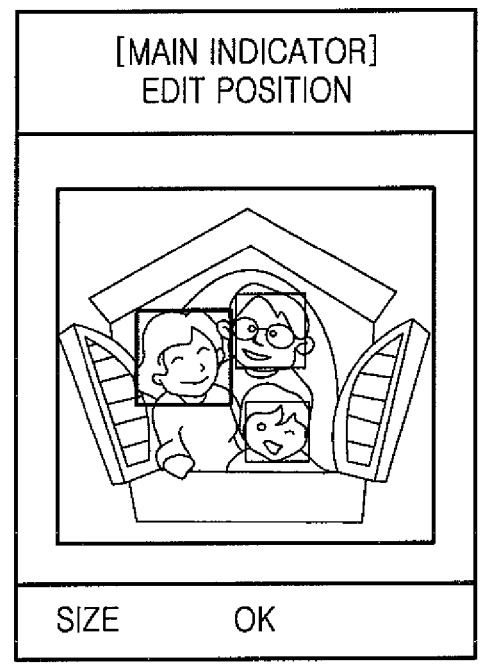

In the above description referring to FIG. 4, a face region and a face are recognized in an image through a face recognition algorithm and contact information is automatically or manually recorded in the image. Alternatively, a face region and contact information corresponding to the face region may be received directly from a user and recorded without executing the face recognition algorithm. Alternatively, when a face region is not properly recognized as the execution result of the face recognition algorithm, for example, when a face region is erroneously recognized in position or size or when a face region is not recognized despite its existence, a user may directly select a range of the face region. That is, a user may edit a size or position of a recognized face region through a menu or function key and may additionally select a new face region. For example, when a face region is erroneously recognized as shown in FIG. 17A, a user may edit the erroneously recognized face region as shown in FIG. 17B.

Figure 7:
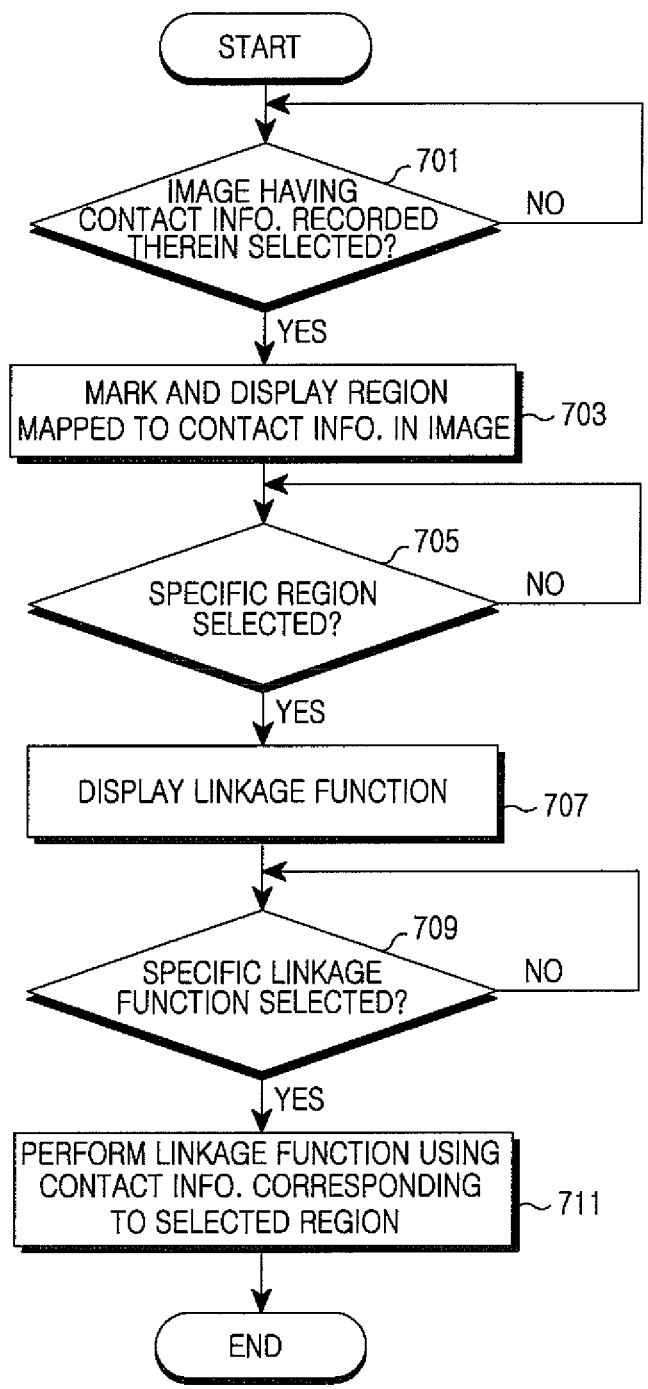
FIG. 7 is a flow diagram illustrating a process of performing a linkage function using an image having contact information recorded therein in a portable terminal according to an exemplary embodiment of the present invention.

FIG. 7 is a flow diagram illustrating a process of performing a linkage function using an image having contact information recorded therein in a portable terminal according to an exemplary embodiment of the present invention.

Referring to FIG. 7, if an image having contact information recorded therein is selected in step 701, the terminal may mark and display caller regions each mapped to the contact information in the selected image in step 703. That is, the terminal may identify image regions each corresponding to the contact information in a User Comment Column field among metadata record fields of the image and may mark the identified image regions in the image. If the image is not selected in step 701, the terminal may repeat step 701.

Then, in step 705, the terminal may determine whether a specific region is selected from the marked image regions. If the specific region is selected, the terminal may display a linkage function that is executable using contact information mapped to the specific region in step 707. Here, when the specific region is selected, the terminal may display a name or a phone number among the contact information corresponding to the specific region. If the specific region is not selected, the terminal may repeat step 705.

For example, when an "A" region is selected from caller regions marked in an image as illustrated in FIG. 8, the terminal may display "Angelina" as a name of a caller corresponding to the "A" region and may display a linkage function such as "Call," "Message," "Phonebook," "Search" and the like using contact information of "Angelina."

The linkage function may be a voice communication, a video communication, an SMS, an MMS, an instant message, a facsimile, an e-mail, a caller ID setting and the like. The video communication function may be displayed only when a caller terminal corresponding to the contact information supports a video communication.

Then, if a specific linkage function is selected in step 709, the terminal may identify contact information corresponding to the selected region in the User Comment Column field of the image and may perform the linkage function in step 711. Then, the terminal may terminate the process. For example, if a region having a name "Angelina" recorded therein is selected in the image and a linkage function "Call" is selected as illustrated in FIG. 8, the terminal may identify a phone number corresponding to the name "Angelina" in the User Comment Column field of the image and may perform the linkage function "Call."

In the above description, the terminal may add a caller ID setting function as the linkage function and set the selected region and contact information corresponding to the selected region as a caller ID.

Figure 9:
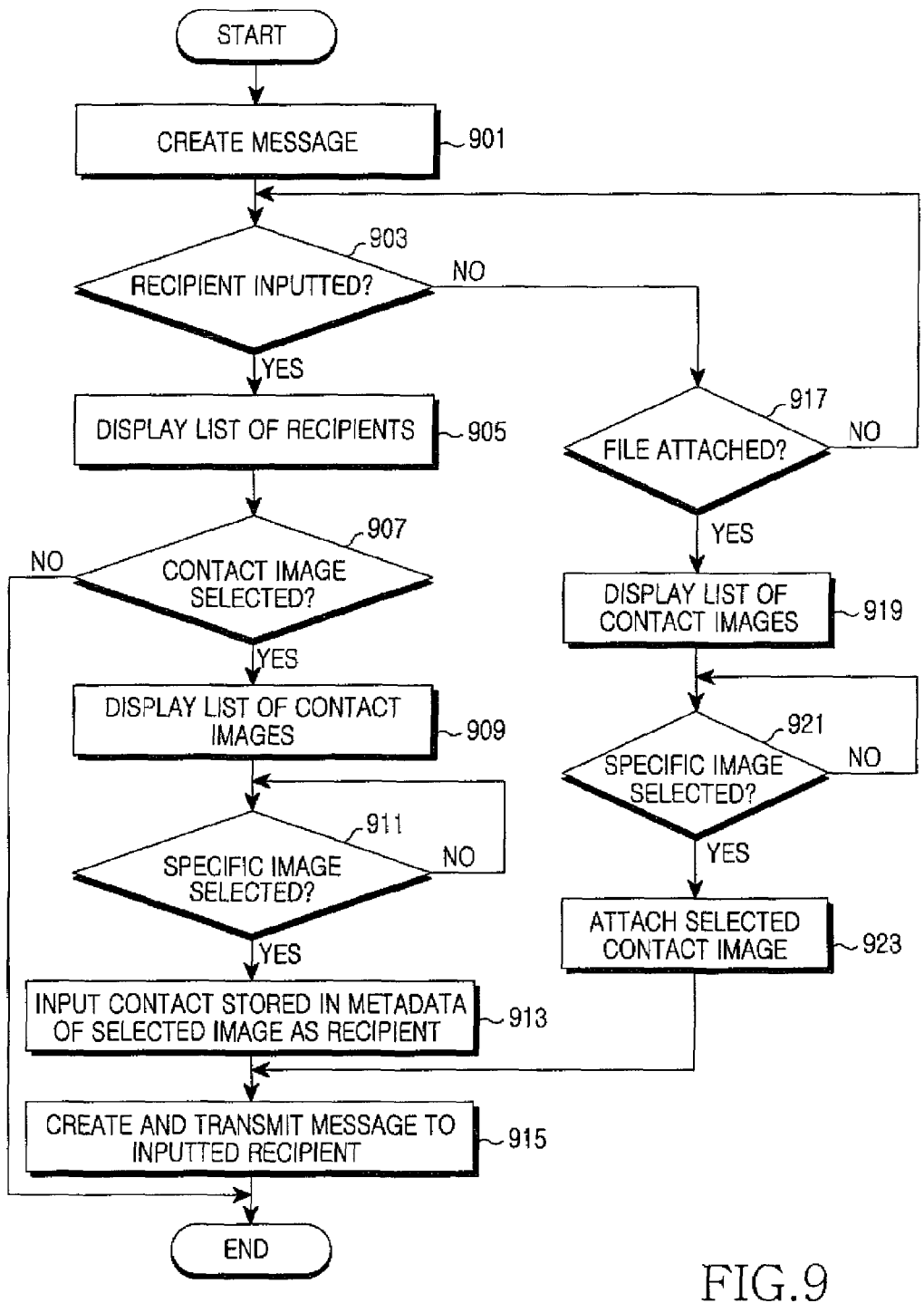
FIG. 9 is a flow diagram illustrating a process of transmitting a message and transmitting contact information using an image in a portable terminal according to an exemplary embodiment of the present invention.

FIG. 9 is a flow diagram illustrating a process of transmitting a message and transmitting contact information using an image in a portable terminal according to an exemplary embodiment of the present invention.

Referring to FIG. 9, if a message creation event occurs in step 901, the terminal may determine whether an event for adding message recipients occurs in step 903.

Figure 10:
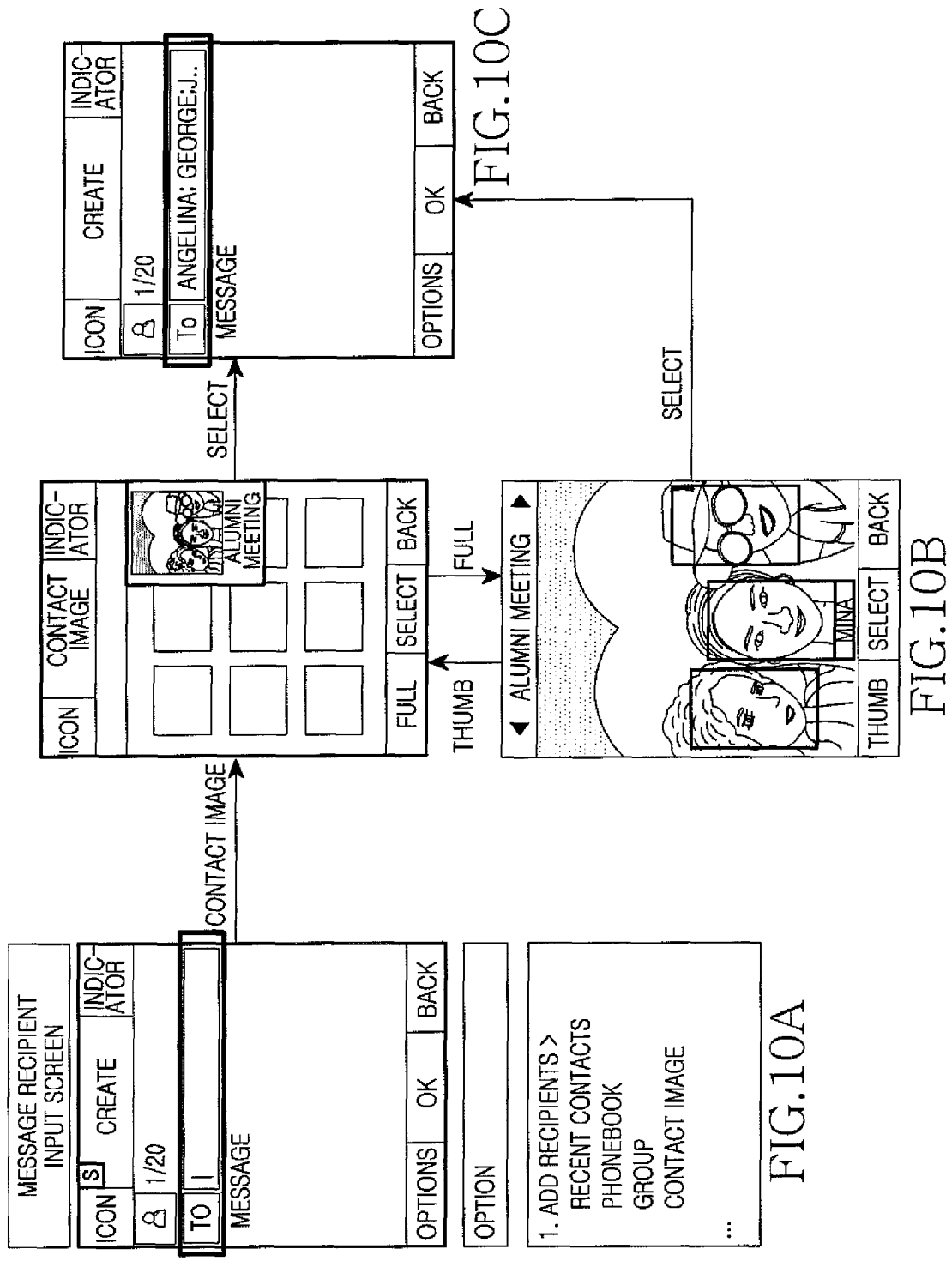
FIGS. 10A to 10C are diagrams illustrating a screen configuration for transmitting a message using contact information recorded in an image in a portable terminal according to an exemplary embodiment of the present invention.

If the event for adding the recipients occurs, the terminal may display a list for searching for the recipients in step 905. For example, the terminal may display "Recent Contacts," "Phonebook," "Group," and "Contact image" as illustrated in FIG. 10A so that recipients' contacts may be selected or searched.

Then, the terminal may determine whether "Contact image" is selected from the displayed list for recipient search in step 907. If the "Contact image" is not selected, the terminal may terminate the process. If the "Contact image" is selected, the terminal may display a list of contact images stored in the contact image DB 308 in step 909. The contact image may be displayed in a thumbnail form and enlarged to full size according to a user's selection as illustrated in FIG. 10B. The contact image may be classified and displayed by a user, a group, or a folder including contact information recorded in the image.

Then, if a specific contact image is selected from the displayed list of contact images in step 911, the terminal may input, as a recipient contact, contact information recorded in metadata of the selected image in step 913. For example, the terminal may input, as a message recipient, either a name or a phone number among the contact information recorded in the image as illustrated in FIG. 10C. In cases where a user selects one or plural regions in a contact image that includes contact information of a plurality of callers, the user may use only contact information corresponding to the selected region as recipient contacts. If the specific contact image is not selected in step 911, the terminal may repeat step 911.

Then, in step 915, the terminal may create a message under a user's control and may transmit the message to the inputted recipient contact. After that, the terminal may terminate the process.

If the event for adding the recipients does not occur in step 903, the terminal may determine whether an event for file attachment occurs in step 917. If the event for the file attachment does not occur, the terminal may return to step 903 and repeat step 903 and its subsequent steps. If the event for the file attachment occurs, the terminal may display the list of contact images stored in the contact image DB 308 of the terminal in step 919.

Figure 11:
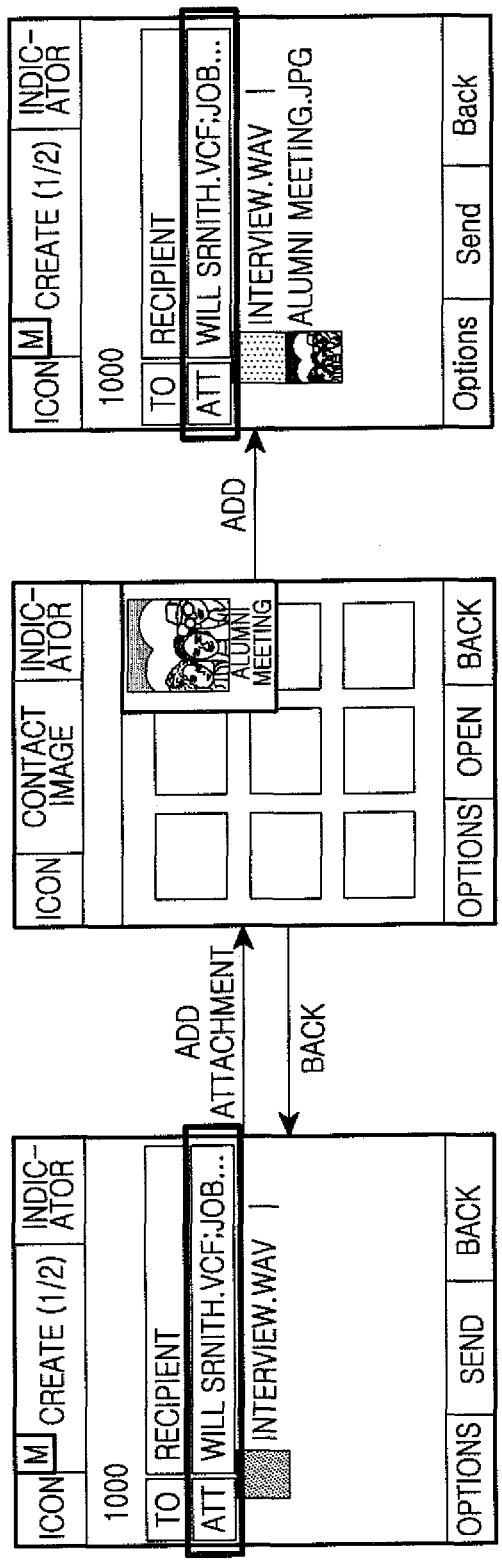
FIG. 11 is a diagram illustrating a screen configuration for transmitting contact information to other terminals in a portable terminal according to an exemplary embodiment of the present invention.

Then, if a specific contact image is selected from the displayed list of contact images in step 921, the terminal may attach the selected contact image to the message in step 923. Then, in step 915, the terminal may create a message under a user's control and then may transmit the message to the inputted recipient contact. The terminal may easily transmit one or plural contacts to other terminals by, upon transmission, attaching the contact image to the message as aforementioned. For example, when file attachment is selected and a contact image "Alumni meeting" among the displayed list of contact images is attached as illustrated in FIG. 11, the terminal may transmit contact information recorded in metadata of the contact image "Alumni meeting" to caller terminals. Upon receiving the contact image by a message, the caller terminals may also register the contact information recorded in the contact image to phonebooks.

Then, the terminal may terminate the process.

Figure 12:
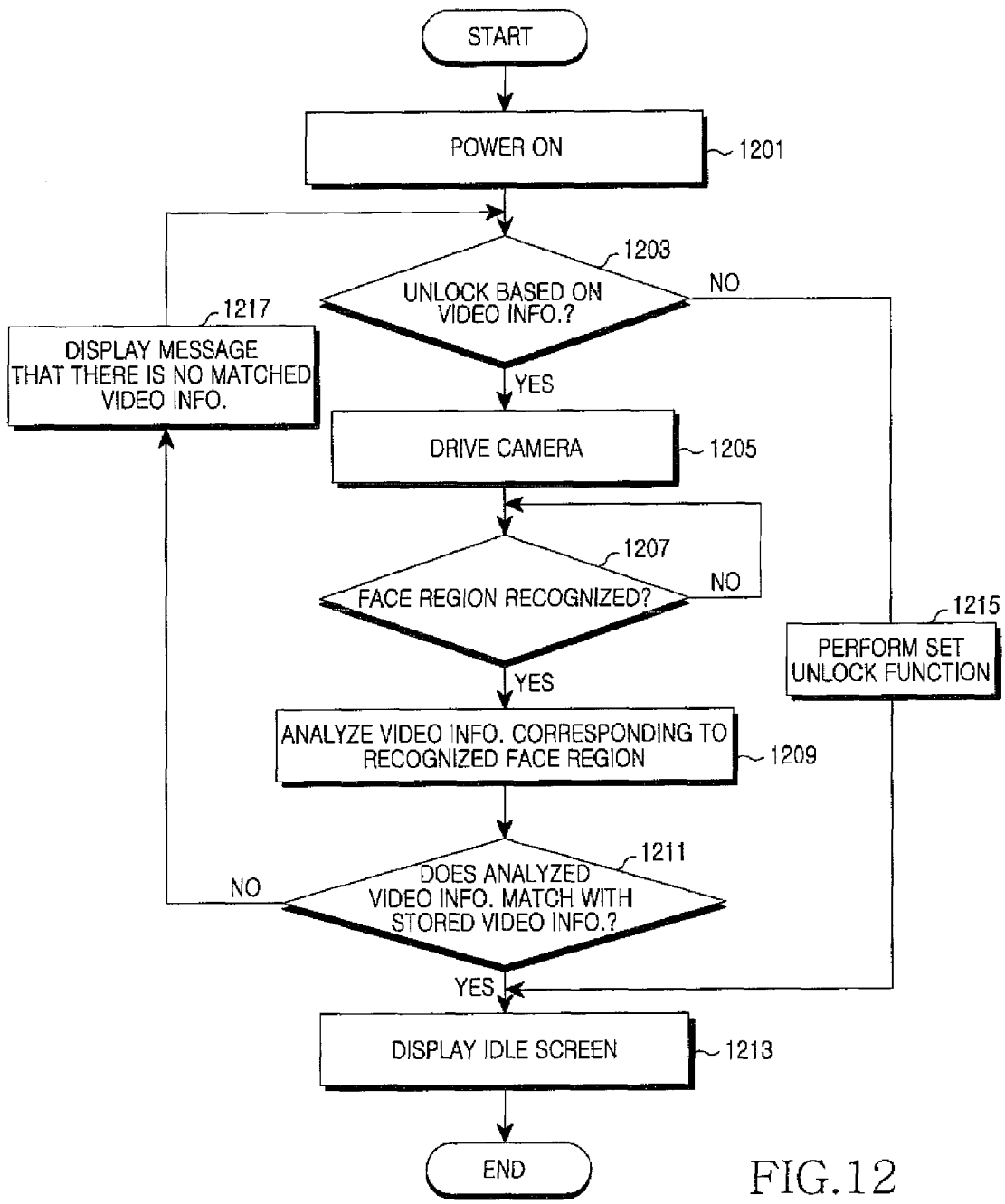
FIG. 12 is a flow diagram illustrating a process of performing a security function using video information in a portable terminal according to an exemplary embodiment of the present invention.

FIG. 12 is a flow diagram illustrating a process of performing a security function using video information in a portable terminal according to an exemplary embodiment of the present invention. An example of a security function implemented when a portable terminal, in which a power On/Off is limited, is powered on is described below. The security function is applicable even at the time of the use limit of a specific function such as privacy protection, DMB and the like.

Referring to FIG. 12, if the terminal is powered on by a user in step 1201, the terminal may determine whether an unlock function based on video information is set in step 1203. If an unlock function other than the unlock function based on video information is set, the terminal may perform the set unlock function in step 1215. The set unlock function may include an unlock function based on a password input, voice recognition or the like.

If the unlock function based on video information is set, the terminal may control a camera unit 316 to drive a camera in step 1205 and determine if a face region is recognized in step 1207. That is, the terminal may control the camera unit 316 to capture an image and then determine whether a face region is recognized in the captured image.

If a face region is recognized, the terminal may analyze video information corresponding to the recognized face region in step 1209 and compare the analyzed video information with video information stored in a storage unit 306 and may determine whether there is stored video information matching with the analyzed video information in step 1211.

If the analyzed video information does not match with the stored video information, the terminal may display a message indicating that there is no matched video information on a display unit 312 in step 1217 and return to step 1203. The message may be a pop-up message. Here, the terminal may display a selection window for selecting if a re-recognition should occur or not on the display unit 312 and may determine selection or non-selection as to whether to re-recognize a face region.

If the analyzed video information matches with the stored video information, the terminal may display an idle screen on the display unit 312 in step 1213. Here, the terminal may calculate a matching percentage between the analyzed video information and the stored video information and perform the unlock function according to the calculated matching percentage. For example, when the calculated matching percentage is equal to or more than 70%, the terminal may perform the unlock function. When the matching percent is equal to or more than 30%, the terminal may display a password input window for inputting a password and the like, receive a password, and perform the unlock function or request for video information re-recognition.

Figure 13:
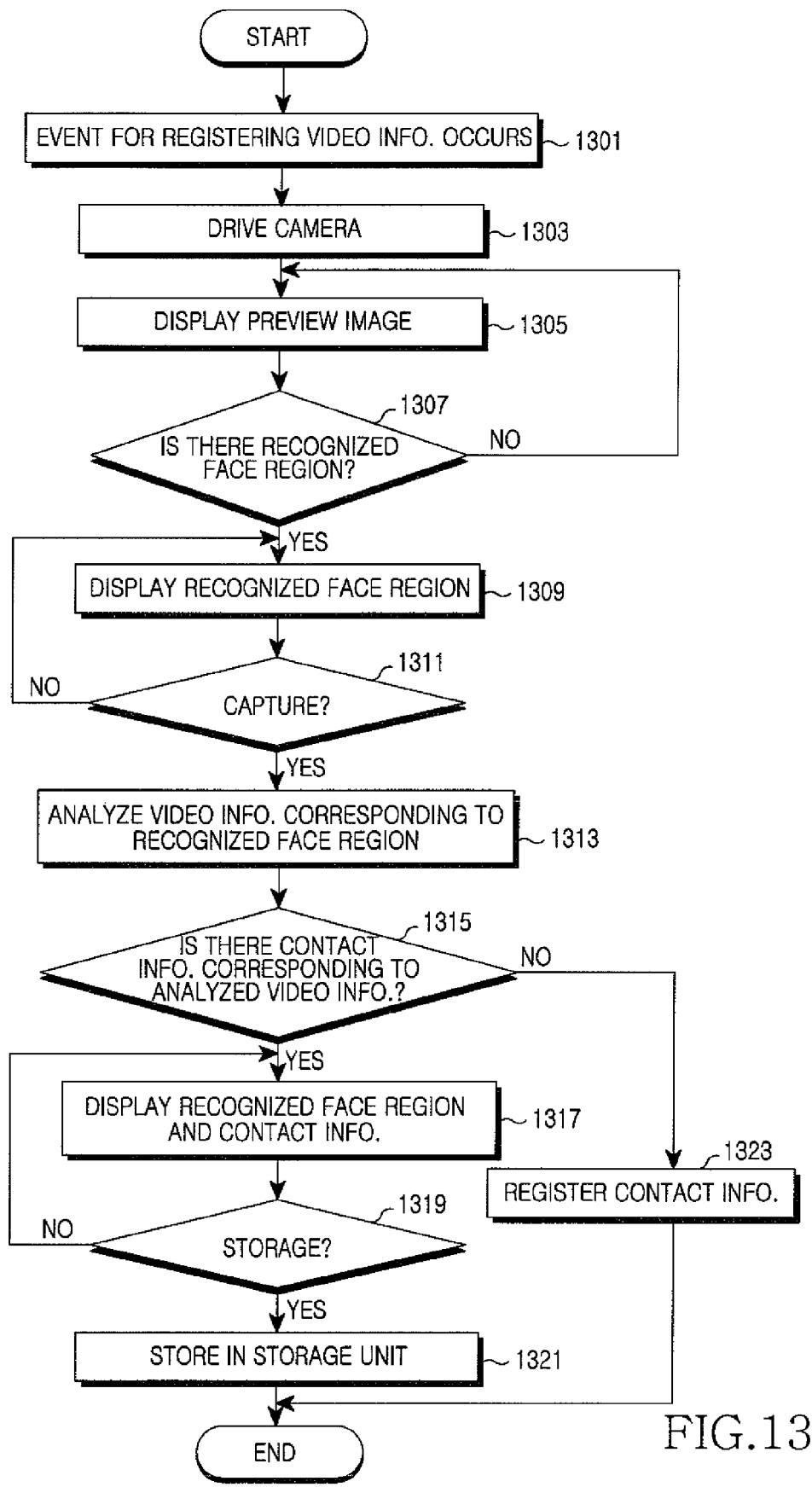
FIG. 13 is a flow diagram illustrating a process of registering video information in a portable terminal according to an exemplary embodiment of the present invention.

FIG. 13 is a flow diagram illustrating a process of registering video information in a portable terminal according to an exemplary embodiment of the present invention.

Referring to FIG. 13, if an event for registering video information occurs in step 1301, the terminal drives a camera unit 316 in step 1303. Then, the terminal may display a preview image inputted through the camera unit 316 on a display unit 312 in step 1305 and may determine whether there is a face region recognized in the displayed preview image through a face recognition algorithm in step 1307. If there is no face region in the preview image, the terminal may return to step 1305 and display a preview image inputted through the camera unit 316 on the display unit 312. In the above description, if the video information registration event occurs, the terminal may drive the camera unit 316 and recognize a face region in an image inputted through the camera unit 316. However, even when a camera function is selected to drive the camera unit 316 and then a face recognition function is selected, the terminal may detect it and recognize a face region in an image inputted through the camera unit 316.

If there is a face region in the preview image, in step 1309, the terminal may control the display unit 312 to mark the face region with a frame or figure and the like so that a user may identify the face region. Then, in step 1311, the terminal may identify whether an event for image capture occurs through an input unit 310. If an OK or snapshot key is pressed through the input unit 310, the terminal may determine that the image capture event occurs and, in step 1313, may analyze video information corresponding to a recognized face region.

Then, in step 1315, the terminal may compare the analyzed video information with video information stored in a storage unit 306 and determine whether there is contact information corresponding to the analyzed video information. That is, when there is stored video information similar or matching with the analyzed video information, the terminal may determine whether there is contact information corresponding to the stored video information, thus identifying whether or not there is the contact information.

If there is contact information corresponding to the analyzed video information, in step 1317, the terminal may display the recognized face region and the contact information together with the captured image on the display unit 312. Then, in step 1319, the terminal may determine whether a storage event occurs. If an OK or storage key is actuated through the input unit 310, the terminal may store video information corresponding to the recognized face region, link information on contact information corresponding to the video information, and the captured image in the storage unit 306 in step 1321 and then terminate the process. If not so, the terminal may return to step 1317.

If there is no contact information corresponding to the analyzed video information, in step 1323, the terminal may register the contact information. This is described below in detail with reference to FIGS. 14A and 14B.

Then, the terminal may terminate the process.

Figure 14A:
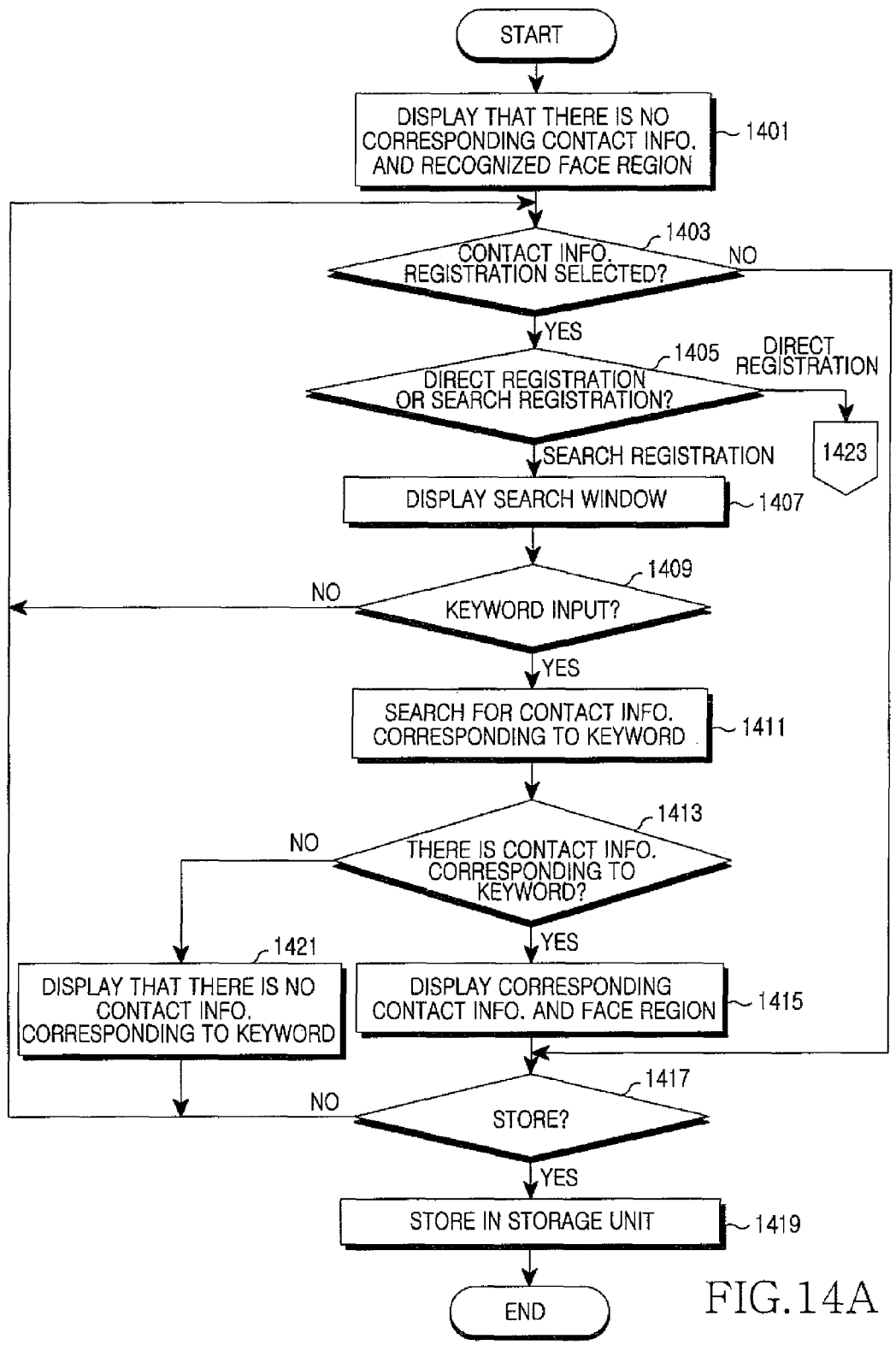
FIGS. 14A and 14B are flow diagrams illustrating a process of registering contact information in a portable terminal according to an exemplary embodiment of the present invention.
Figure 14B:
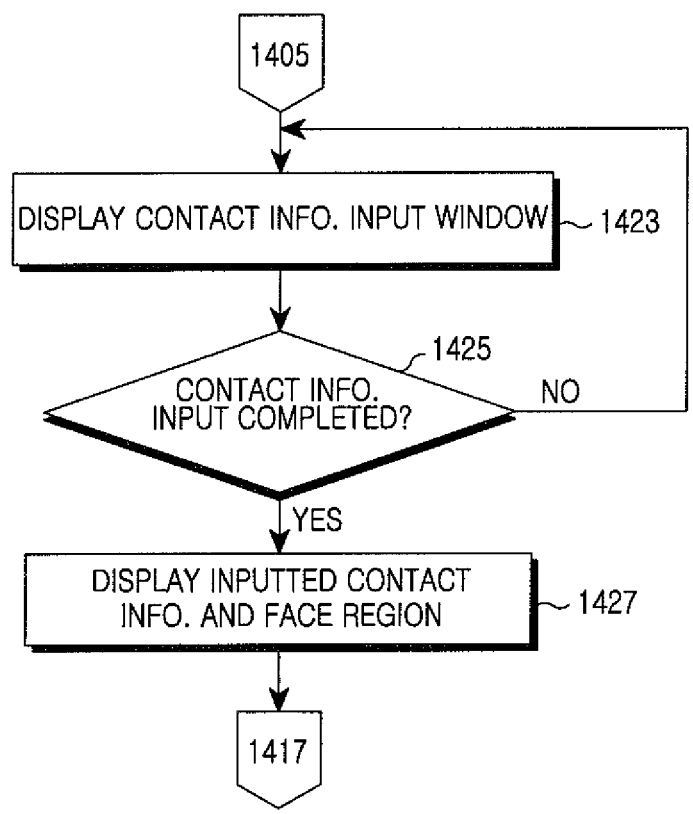

FIGS. 14A and 14B are flow diagrams illustrating a process of registering contact information in a portable terminal according to an exemplary embodiment of the present invention.

Referring to FIGS. 14A and 14B, in step 1401, the terminal may include, in an image, a message indicating that there is no contact information corresponding to analyzed video information and a recognized face region and display the message and recognized face region on a display unit 312. Then, in step 1403, the terminal may determine whether contact information registration is selected through an input unit 310. Here, the terminal may mark contact information as "unknown."

If the contact information registration is selected, in step 1405, the terminal may determine whether a contact information registration method is either a search registration method or a direct registration method. That is, the terminal may display a selection window for selecting either the search registration method or the direct registration method and may determine whether a user selects either the search registration method or the direct registration method.

If the search registration method is selected through the input unit 310, the terminal may display a contact information search window in step 1407 and may determine whether a keyword is input in a search window in step 1409. If the keyword is input, the terminal may search contact information stored in a storage unit 306 for contact information corresponding to the keyword in step 1411 and may determine whether there is contact information corresponding to the keyword in step 1413. A method for searching contact information through a keyword may be a name search method, a group search method and the like.

If there is no contact information corresponding to the keyword, the terminal may display that there is no contact information corresponding to the keyword in step 1421 and return to step 1403. Here, the terminal may display a selection window for re-registering contact information and select whether to re-register contact information through the input unit 310.

If there is contact information corresponding to the keyword, the terminal may link the corresponding contact information and a face region to an image and mark the corresponding contact information and the face region in step 1415 and may determine whether an instruction to store is selected through the input unit 310 in step 1417.

If the direct registration method is selected through the input unit 310 in step 1405, the terminal may display a contact information input window on the display unit 312 in step 1423. Then, in step 1425, the terminal may determine whether a contact information input is completed. Here, if an OK or enter key and the like is input by a user, the terminal may determine that the contact information input is complete.

If the contact information input is complete in step 1425, the terminal may establish a link between video information corresponding to the recognized face region and the input contact information and then display the input contact information and the recognized face region together with the image on the display unit 312 in step 1427. Then, the terminal may determine whether the instruction to store is selected through the input unit 310 in step 1417. If the contact information input is not complete in step 1425, the terminal may return to step 1423.

If the storage is selected, in step 1419, the terminal may control a storage unit 306 to include video information, contact information corresponding to a recognized face region, and link information in face recognition data and store the video information, the contact information, and the link information, include an image in general data and store the image, and then terminate the process. Here, the terminal may store the recognized face region, the video information, and the contact information in a UserComment field. If in step 1417, no instruction to store is selected the terminal may return to step 1403.

The search registration method and the direct registration method have been described as the contact information registration method in the above exemplary embodiment of the present invention. However, a method for registering contact information using a file name for storing an image may be used. That is, if a user inputs a file name for storing an image and then selects face recognition, the terminal may detect it, recognize a face region included in an image, analyze video information corresponding to a recognized face region, and compare the file name with contact information stored on a per-group basis or on a per-user basis in the storage unit 306. If contact information matches with the file name, the terminal may establish a link between the identified contact information and the analyzed video information and may control a display unit 312 to include the recognized face region and the identified contact information in the image and may display the recognized face region and the identified contact information.

In the aforementioned exemplary embodiment of the present invention, the terminal may also set the image having the contact information recorded therein as an idle screen. That is, the terminal may set the image on which the contact information and the face region are marked as an idle screen and may set only an image excepting the contact information and the face region as an idle screen. Thus, as shown in FIG. 7, the terminal may perform a variety of linkage functions through a user selection on the idle screen. For the above functions, a user may select respective face regions of callers having frequent contacts from a plurality of images stored in the terminal, edit the selected face regions as one image, and set the edited image as an idle screen. If so, the terminal may recognize face regions in an image of a set idle screen through a face recognition algorithm and store contact information corresponding to the respective recognized face regions in the idle screen image.

Exemplary embodiments of the present invention have an effect of being able to transmit contact information related to an image with only delivery of the image to a caller and may help a user to intuitively identify a group member through the image, by recording and storing the contact information in metadata of the image and providing a linkage function such as a phonebook using the image having the contact information recorded therein. Also, exemplary embodiments of the present invention have an effect of being able to automatically record contact information with no need for a user to input the contact information one by one and easily may implement a linkage function such as "Call" and "Message" with only a selection of an image, by distinguishing members in the image through a face recognition algorithm and searching an existing phonebook database for corresponding contact information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a phonebook using an image in a portable terminal, the method comprising:
   recognizing a face on the image;
   determining contact information corresponding to the recognized face;
   recording location information of a region of the recognized face and the contact information in metadata of the image;
   when an event for displaying the image occurs, displaying the image such that the region of the recognized face is marked on the image; and
   performing a linkage function using the contact information corresponding to the recognized face,
   wherein the location information of the region of the recognized face includes coordinates of the region of the recognized face on the image.

2. The method of claim 1, wherein the location information of the region of the face and the contact information is recorded using a UserComment field among an Exchangeable image file (Exif) Image File Directory (IFD) field.

3. The method of claim 1, wherein the contact information comprises at least one of a name, a phone number, an electronic mail (e-mail) address, an address, an anniversary, and a group.

4. The method of claim 1, further comprising recording an image region corresponding to the contact information in the metadata of the image.

5. The method of claim 1, wherein the recording of the location information of the region of the recognized face and the contact information in the metadata of the image comprises:
   performing a face recognition algorithm and marking a recognized face region on the image,
   wherein the region of the recognized face that is marked on the image has at least one of an adjustable size, an adjustable position, and a new face region.

6. The method of claim 1, wherein the determining of the contact information corresponding to the recognized face comprises:
   determining whether there is contact information corresponding to the recognized face in an existing phone book database.

7. The method of claim 6, further comprising, if there is no contact information, receiving contact information inputted by a user.

8. The method of claim 6, further comprising, if there is no contact information, receiving a keyword from a user, determining whether there is contact information corresponding to the keyword.

9. The method of claim 6, further comprising, if there is no contact information, determining a file name of the image, determining whether there is a contact comprising the file name.

10. The method of claim 1, wherein the recognizing of the face on the image comprises:
    selecting, by a user, a specific region in the image; and
    determining the selected region as the face region.

11. The method of claim 1, wherein the linkage function comprises any one of a call, a Short Message Service (SMS), a Multimedia Message Service (MMS), a facsimile, and e-mail.

12. The method of claim 1, wherein the performing of the linkage function using the contact information corresponding to the recognized face comprises:
    displaying a list of linkage functions that are executable using the contact information.

13. The method of claim 1, wherein the displaying of the image such that the region of the recognized face is marked on the image comprises:
    marking each region having the contact information in the image;
    selecting, by a user, a specific face region in the image; and
    displaying contact information corresponding to a specific region selected.

14. The method of claim 1, wherein the performing of the linkage function using the contact information corresponding to the face comprises:
    selecting the image as a reception contact for a message; and
    transmitting the message using the contact information recorded in the image.

15. The method of claim 1, wherein the performing of the linkage function using the contact information corresponding to the face comprises:
    selecting at least one face region in the image as reception contacts for a message; and
    transmitting the message using contact information corresponding to the at least one face region among the contact information recorded in the image.

16. The method of claim 1, wherein the performing of the linkage function using the contact information corresponding to the face comprises:
attaching the image having the contact information recorded therein to a message and transmitting the message to a caller terminal for contact delivery.

17. The method of claim 1, further comprising:
setting the image having the contact information recorded therein as an idle screen; and
performing the linkage function using the image that is set as the idle screen.

18. The method of claim 17, further comprising:
enlarging the image set as the idle screen to a size corresponding to full size screen and displaying the enlarged image; and
one of marking and not marking the contact information and a face region on the image depending on a user's selection.

19. The method of claim 1, wherein the image is classified and managed by at least one of a user, a group, and a folder comprising the contact information.

20. The method of claim 1, further comprising setting the image having the contact information recorded therein, as a caller IDentification (ID).

21. The method of claim 1, wherein the setting of the image as the caller ID comprises:
selecting a face region from the image to be set as a caller ID;
cropping only the face region in the image and displaying the cropped face region; and
mapping the cropped face region to contact information corresponding to the face region, and storing a result of the mapping as the caller ID.

22. An apparatus for providing a phonebook using an image in a portable terminal, the apparatus comprises:
a contact image manager for recognizing a face on the image, for determining a contact information corresponding to the recognized face, and for recording location information of a region of the recognized face and the contact information in metadata of an image; and
a controller for controlling to display the image such that the region of the recognized face is marked on the image when an event for displaying the image occurs, and for performing a linkage function using the contact information corresponding to the face,
wherein the location information of the region of the recognized face includes coordinates of the region of the recognized face on the image.

23. The apparatus of claim 22, wherein the contact image manager records the location information of the region of the face and the contact information using a UserComment field among an Exchangeable image file (Exif) Image File Directory (IFD) field.

24. The apparatus of claim 22, wherein the contact information comprises at least one of a name, a phone number, an electronic mail (e-mail) address, an address, an anniversary, and a group.

25. The apparatus of claim 22, wherein the contact image manager records an image region corresponding to the contact information in the metadata of the image.

26. The apparatus of claim 22, wherein, if there is the location information of the region of the recognized face and the contact information, the contact image manager automatically records the contact information stored in the existing phonebook database and, if there is no location information of the region of the recognized face and the contact information, the contact image manager receives the contact information inputted by a user or through a keyword or filename.

27. The apparatus of claim 22, wherein the region of the recognized face that is marked on the image has at least one of an adjustable size, an adjustable position, and a new face region.

28. The apparatus of claim 22, further comprising:
an input unit for selecting a specific region in the image by a user and for determining the selected region as the face region.

29. The apparatus of claim 22, wherein the linkage function comprises any one of a call, a Short Message Service (SMS), a Multimedia Message Service (MMS), a facsimile, and e-mail.

30. The apparatus of claim 22, wherein the image having the contact information recorded therein can be set as at least one of an idle screen and a caller IDentification (ID).

31. The apparatus of claim 30, wherein the controller crops only a face region selected by a user in the image and sets the cropped face region and contact information corresponding to the cropped face region as the caller ID.

32. The apparatus of claim 22, wherein the controller classifies and manages the image by at least one of a user, a group, and a folder comprising the contact information.

33. The apparatus of claim 22, wherein, upon attempting to execute a function requiring security, the controller controls the contact image manager to acquire video information on a face region in an image input from a camera, compares whether the acquired video information corresponds with previously stored video information, and determines whether the attempted function is executed.

34. The apparatus of claim 33, wherein the function requiring the security comprises at least one of a power on function, a privacy protection function, an outgoing communication function, and a pay channel service function.

* * * * *